US008365020B2

(12) United States Patent
Laor

(10) Patent No.: US 8,365,020 B2
(45) Date of Patent: Jan. 29, 2013

(54) MECHANISM FOR SAVING CRASH DUMP FILES OF A VIRTUAL MACHINE ON A DESIGNATED DISK

(75) Inventor: Dor Laor, Tel Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 0 days.

(21) Appl. No.: 12/726,825

(22) Filed: Mar. 18, 2010

(65) Prior Publication Data

US 2011/0231710 A1    Sep. 22, 2011

(51) Int. Cl.
    *G06F 11/00* (2006.01)
(52) U.S. Cl. .......................... 714/38.11; 718/1
(58) Field of Classification Search .................. None
    See application file for complete search history.

(56) References Cited

U.S. PATENT DOCUMENTS

| 6,681,348 | B1* | 1/2004 | Vachon | 714/45 |
|---|---|---|---|---|
| 6,854,115 | B1 | 2/2005 | Traversat et al. | |
| 7,529,897 | B1 | 5/2009 | Waldspurger et al. | |
| 7,899,788 | B2 | 3/2011 | Chandhok et al. | |
| 7,925,923 | B1 | 4/2011 | Hyser et al. | |
| 8,019,789 | B2 | 9/2011 | Dahms et al. | |
| 8,024,566 | B2 | 9/2011 | Stanev | |
| 8,041,887 | B2 | 10/2011 | Ito | |
| 8,060,476 | B1 | 11/2011 | Afonso et al. | |
| 8,156,492 | B2 | 4/2012 | Dahlstedt | |
| 2002/0029359 | A1* | 3/2002 | Kiyoi et al. | 714/45 |
| 2004/0088415 | A1 | 5/2004 | Chandrasekar et al. | |
| 2006/0026585 | A1 | 2/2006 | Haselden et al. | |
| 2006/0143534 | A1* | 6/2006 | Dall | 714/38 |
| 2007/0006226 | A1* | 1/2007 | Hendel | 718/1 |
| 2007/0112812 | A1 | 5/2007 | Harvey et al. | |
| 2007/0226443 | A1 | 9/2007 | Giampaolo | |
| 2007/0255926 | A1 | 11/2007 | Cuang et al. | |
| 2007/0271610 | A1 | 11/2007 | Grobman | |
| 2008/0098161 | A1 | 4/2008 | Ito | |
| 2008/0127348 | A1 | 5/2008 | Largman et al. | |
| 2008/0162760 | A1 | 7/2008 | Jacob | |
| 2008/0163008 | A1 | 7/2008 | Jacob | |
| 2009/0157942 | A1 | 6/2009 | Kulkarni | |
| 2009/0172409 | A1* | 7/2009 | Bullis et al. | 713/189 |
| 2009/0228743 | A1 | 9/2009 | Ponnuswamy | |
| 2009/0234987 | A1 | 9/2009 | Lee et al. | |
| 2009/0248949 | A1* | 10/2009 | Khatri et al. | 711/6 |
| 2010/0083250 | A1* | 4/2010 | Nakai | 718/1 |
| 2010/0251219 | A1* | 9/2010 | Peacock et al. | 717/128 |
| 2010/0280997 | A1 | 11/2010 | Lillibridge et al. | |
| 2010/0306173 | A1 | 12/2010 | Frank | |
| 2010/0306770 | A1 | 12/2010 | Frank | |

(Continued)

OTHER PUBLICATIONS

U.S. Appl. No. 12/475,540, filed May 31, 2009, Shahar Frank.

(Continued)

*Primary Examiner* — Christopher McCarthy
(74) *Attorney, Agent, or Firm* — Lowenstein Sandler PC

(57) ABSTRACT

A mechanism for saving crash dump files of a virtual machine (VM) on a designated disk is disclosed. A method of embodiments of the invention includes configuring an operating system (OS) of a VM managed by a hypervisor of a host machine to store any crash dump files created by the VM to a designated crash dump virtual disk associated with the VM but accessible outside of operations of the VM, determining that the VM experienced a crash event, stopping operations of the VM, and obtaining a crash dump file created by the VM that details the crash event from the designated crash dump virtual disk.

18 Claims, 4 Drawing Sheets

U.S. PATENT DOCUMENTS

2011/0154133 A1 * 6/2011 Ganti et al. .................. 714/54
2011/0231710 A1 9/2011 Laor et al.

OTHER PUBLICATIONS

U.S. Appl. No. 12/475,543, filed May 31, 2009, Shahar Frank.
Red Hat Israel, Ltd. Non-Final Office Action for U.S. Appl. No. 12/475,543, mailed Sep. 16, 2011.
Qumranet, Solid ICE, Connection Broker, Apr. 2008, 7 pages.
Qumranet, KVM-Kernel-based Virtualization Machine, White Paper, 2006, 5 pages.
Qumranet, Solid ICE, Overview, Apr. 2008, 15 pages.
Qumranet, Solid ICE, Provisioning Manager, Apr. 2008, 5 pages.
Qumranet, Solid ICE, Virtual Desktop Server (VDS), Apr. 2008, 6 pages.
Red Hat Israel, Ltd. Nonfinal Office Action for U.S. Appl. No. 12/475,540, mailed Dec. 21, 2011.
Red Hat Israel, Ltd. Final Office Action for U.S. Appl. No. 12/475,543, mailed Mar. 28, 2012.
USPTO, Final Office Action for U.S. Appl. No. 12/475,540 mailed May 10, 2012.
USPTO, Office Action for U.S. Appl. No. 12/475,543 mailed Sep. 16, 2011.

* cited by examiner

300

As part of a hypervisor preparing an OS of a VM for use, configure a crash dump file path for a crash dump file of the VM to be stored in a separate virtual disk outside of the main root file system of the VM as a standalone file that is associated with the hypervisor
310

Determine that a crash event at a virtual machine (VM) managed by a hypervisor has occurred
320

Shut down the VM
330

Obtain a crash dump file detailing the crash events from the crash dump virtual disk associated with the hypervisor
340

Send the obtained crash dump file to support for analysis
350

Create a new empty crash dump disk image outside of the VM to be assigned to the VM
360

Reboot the VM
370

*Fig. 3*

MECHANISM FOR SAVING CRASH DUMP FILES OF A VIRTUAL MACHINE ON A DESIGNATED DISK

TECHNICAL FIELD

The embodiments of the invention relate generally to virtualization systems and, more specifically, relate to a mechanism for saving crash dump files of a virtual machine (VM) on a designated disk.

BACKGROUND

Virtualization allows multiplexing of resources of an underlying host machine between different virtual machines (VMs). The host machine allocates a certain amount of its resources to each of the VMs. Each VM is then able to use the allocated resources to execute applications, including operating systems (referred to as guest operating systems). The software layer providing the virtualization is commonly referred to as a hypervisor and is also known as a virtual machine monitor (VMM), a kernel-based hypervisor, or a host operating system. The hypervisor emulates the underlying hardware of the host machine, making the use of the VM transparent to the guest operating system. In some systems, the host machine may be a centralized server that is partitioned into multiple VMs to provide virtual desktops to the users. The centralized host manages these VMs, including the allocation of disk storage to the VMs.

However, one problem that arises in virtualization systems is the handling of VM crash events and the eventual review of crash dump files associated with the VM crash events. If an OS system of a VM has a problem or some type of bug, it can be difficult, and sometimes impossible, to detect the source of the crash. Detecting the source of a crash is very important, as it affects getting support from outside the customer's network. To solve the issues leading to the crash implicitly requires knowing the source of the problem. A crash dump file will detail the source and conditions leading to a crash, and is typically saved in one of the hard drives owned by the OS. In case the OS is running as a VM it will be saved in one of the virtual disks. Each virtual disk is tied to a physical storage location on the host side and is called a VM image. A single VM can have one or more images, one per virtual hard drive. By default the OS keeps the crash image within the main root disk. For example, in Windows it would be kept in drive C, along with the other code/data of the OS.

However, in some cases the VM is not responsive due to the crash and any data associated with the crash, and stored in the VM image, is thereby inaccessible. In a virtualized environment, however, there is no efficient mechanism for removing crash dump files created by a VM and stored at the VM image. As a result, a mechanism to automate the provision of a crash dump file to a source outside of the VM upon a crash event of the VM would be beneficial.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

FIG. 3 is a flow diagram illustrating a method for handling temporary files by a guest operating system of a VM according to an embodiment of the invention.

DETAILED DESCRIPTION

Figure 1:
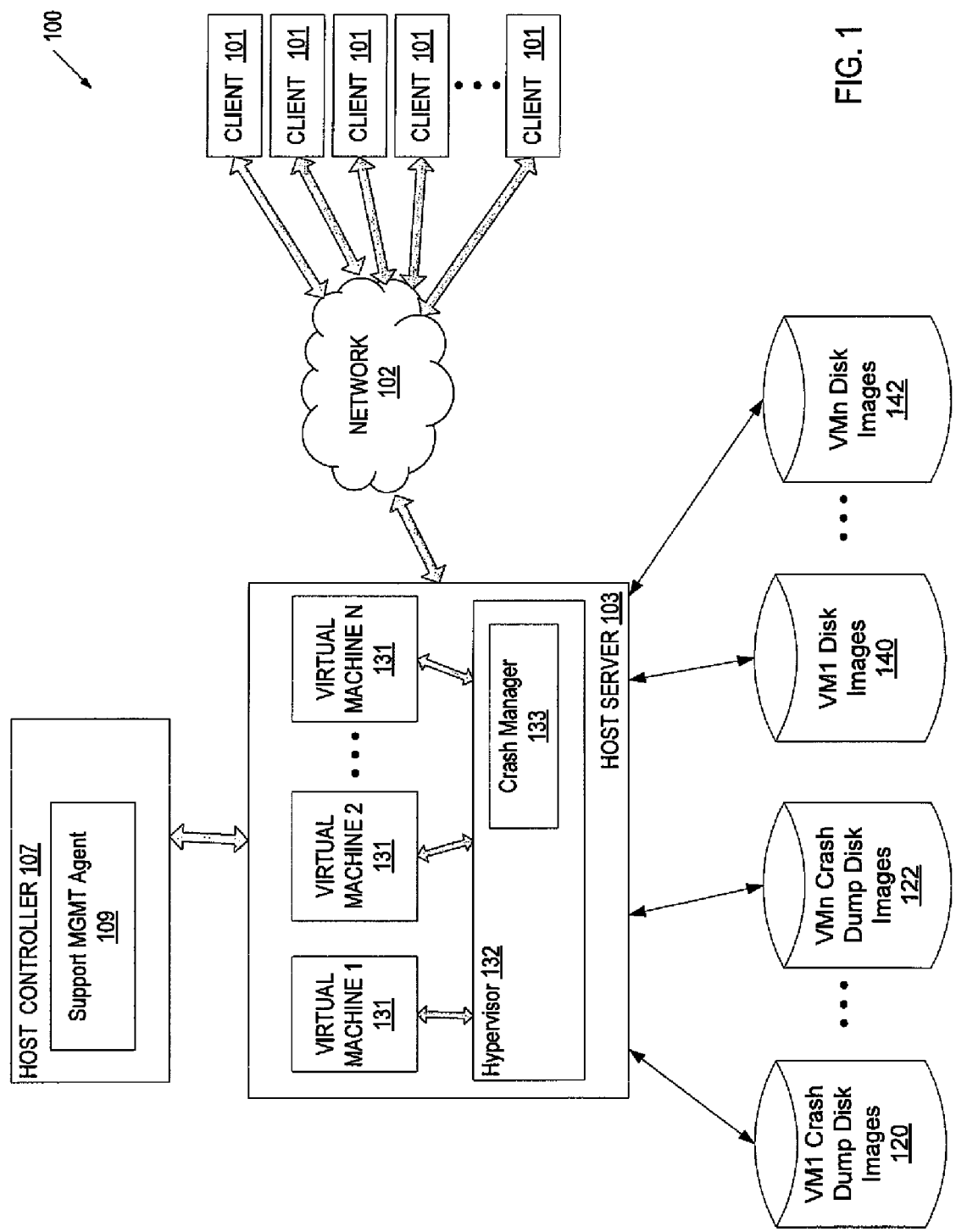
FIG. 1 is a block diagram of an exemplary network architecture 100 in which embodiments of the present invention may operate.

Embodiments of the invention provide a mechanism for saving crash dump files of a virtual machine (VM) on a designated disk. A method of embodiments of the invention includes configuring an operating system (OS) of a VM managed by a hypervisor of a host machine to store any crash dump files created by the VM to a designated crash dump virtual disk associated with the VM but accessible outside of operations of the VM, determining that the VM experienced a crash event, stopping operations of the VM, and obtaining a crash dump file created by the VM that details the crash event from the designated crash dump virtual disk.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide a mechanism for saving crash dump files of a VM on a designated disk. Embodiments of the present invention assign, to each VM, one or more virtual disks, accessible outside of the operations of the VM, that are designated to store crash dump files for the VM. Upon occurrence of a crash event or even once the user suspects the VM is not progressing correctly and might be in an infinite loop, the hypervisor crash manager triggers a special non-maskable interrupt (NMI) to the VM and, in response, the OS running within the VM creates and sends a crash dump file detailing the crash event to its designated crash dump storage location. In this way, crash dump files can be created and removed from the VM without requiring interaction with the VM or specific steps being made by the VM in a comprised state.

FIG. 1 illustrates an exemplary network architecture 100 in which embodiments of the present invention may operate. The network architecture 100 may include a host 103 coupled to one or more clients 101 over a network 102. The network 102 may be a private network (e.g., a local area network (LAN), wide area network (WAN), intranet, etc.) or a public network (e.g., the Internet). The host 103 may be coupled to a host controller 107 (via a network or directly). Alternatively, the host controller 107 may be part of the host 103.

In one embodiment, the clients 101 may include computing devices that have a wide range of processing capabilities. Some or all of the clients 101 may be thin clients, which serve as access terminals for users and depend primarily on the host 103 for processing activities. For example, the client 101 may be a desktop computer, laptop computer, cellular phone, personal digital assistant (PDA), etc. The client 101 may run client applications such as a Web browser and a graphic user interface (GUI). The client 101 may also run other client applications to receive multimedia data streams or other data sent from the host 103 and re-direct the received data to a display or other user interface.

In one embodiment, the host 103 includes a server or a cluster of servers to run one or more VMs 131. Each VM 131 runs a guest operating system (OS) that may be different from one another. The guest OS may include Microsoft Windows, Linux, Solaris, Mac OS, etc. The host 103 also includes a hypervisor 132 that emulates the underlying hardware platform for the VMs 131. The hypervisor 132 may also be known as a VM monitor (VMM), a kernel-based hypervisor or a host operating system.

Each VM 131 can be accessed by one or more of the clients 101 over the network 102. In one scenario, the VM 131 can provide a virtual desktop for the client 101. The VMs 131 can be managed by the host controller 107. The host controller 107 may also add a VM, delete a VM, balance the load on the server cluster, provide directory service to the VMs 131, and perform other management functions.

The host 103 may also be coupled to data stores hosting images 120 and 122 of storage devices (e.g., disks) that store data of the VMs 131. These storage devices may be part of local storage of the host 103 or remote storage (e.g., a storage area network (SAN) or network attached storage (NAS)) coupled to the host 103. The data stores (e.g., repositories) hosting images 120 and 122 may reside on a single or multiple storage devices that may also be part of local storage of the host 103 or remote storage coupled to the host 103. Images 120 and 122 of an individual VM may be stored in one repository or different repositories. In addition, if a VM has two or more users, a separate set of images 120, 122 may be associated with each individual user and may be stored in a single repository or different repositories.

During operation, VMs 131 may encounter bugs or other software or virtual hardware problems that cause the VM 131 to crash. Generally, upon a crash of the VM 131 system, a crash dump file is created and stored in the VM image. The crash dump file is a file that contains a snapshot of useful low-level information about the system that can be used to debug the root cause of the problem. Generally, the OS itself generates the crash dump file upon receiving an indication of an error in the system. However, it can be difficult to access the crash dump file if the VM 131 is non-responsive due to the crash. Furthermore, it is not ideal to have to access all of the standard files of a VM just to obtain the crash dump file.

Another usage of the automatic generation of crash dump is an scenario where either a user or the hypervisor comes to the conclusion that the VM is stuck or running an infinite loop without responding. In such cases, the crash manager may send an NMI event and the OS generates a new crash dump file in response. This file can be analyzed like any other real crash event.

Embodiments of the present invention address the above problem by assigning, to each VM 131, one or more disks 120, 122 accessible outside of the operations of the VM 131 and designated to store crash dump files of the VM 131. In addition, in one embodiment, the VM 131 is configured to create and send the crash dump file upon receipt of a non-maskable interrupt (NMI) from outside of the VM 131. In this way, crash dump files can be created and removed from the VM 131 without requiring interaction with the VM or specific steps being made by the VM 131 in a comprised state.

In some embodiments, the OS of the VM 131 itself identifies that a crash event has occurred and generates a crash dump file on its own (without the occurrence of an NMI event). The occurrence of the Windows™ blue screen exemplifies such a situation. There are also occasions, as described previously, where the VM 131 is stuck on an endless or infinite loop or encounters other failures, and the OS is not able to generate a crash dump file. In these cases, the hypervisor 132 may generate an NMI event that will cause the OS to create the crash dump file.

In FIG. 1, images of disks designated for crash dump file data are shown as VM 1 crash dump disk images 120 through VM N crash dump disk images 122. In one embodiment, the guest OS of each VM 131 is configured to use VM disk images 122 for write operations associated with crash dump files. The crash dump files may then be periodically removed from VM disk images 120, 122 by the crash manager 133 of the hypervisor 132 in host 103. As shown, the crash dump disk images 120, 122 are separate from general designated data storage disks 140, 142 for the VMs 131.

In one embodiment, crash manager 133 may be part of the hypervisor 132 (as shown) or may be separate from, but controlled by, the hypervisor 132. The crash manager 133 may monitor events pertaining to individual VMs 131 in order to identify any events associated with a crash scenario. Upon detecting a predefined crash event pertaining to a specific VM, the crash manager 133 issues a special NMI event to the VM 131 to cause the VM 131 to create and send a crash dump file detailing the crash event.

In one embodiment, the NMI is a computer process interrupt that cannot be ignored by any standard masking techniques. As such, it can signal attention by the VM 131 to create the crash dump file even for non-recoverable errors of the VM 131. The VM 131 creates the crash dump file and stores it in respective crash dump disk 120, 122 for the VM 131. In some embodiments, the NMI sent to the VM may detail where the crash dump file is to be stored. In other embodiments, the VM 131 may be pre-configured by the crash manager 133 with the destination virtual disk 120, 122 to store all crash dump files.

In addition, embodiments of the invention allow for the crash manager 133 to provide any crash dump files stored in the designated crash dump disk storage 120, 122 to the host controller 107 or other management agent upon request. For instance, host controller 107 may include a support management agent 109 that periodically collects logs and other errors files for assessment and delivery to outside vendors if needed. In such a situation, support management agent 109 may automatically include a request for any crash dump files to the hypervisor 132 as part of its periodic log and error collection routine. The hypervisor 132 may then collaborate with its crash manager utility 133 to retrieve any crash dump files from disks 120, 122 and provide them to the support management agent 109 as part of embodiments of the invention.

Embodiments of the invention allow an administrator of the virtualization system 100 to obtain VM crash dump files and send these files outside to support without having to interact with the VM (which may be unresponsive in some cases) and without having to meddle with the standard virtual hard disk that contains many files that are irrelevant to the crash events. In addition, embodiments of the invention preclude the need to have to contact outside support agencies to obtain instructions on how to reproduce the problems that caused a crash and/or obtain the crash dump file from the VM.

Figure 2:
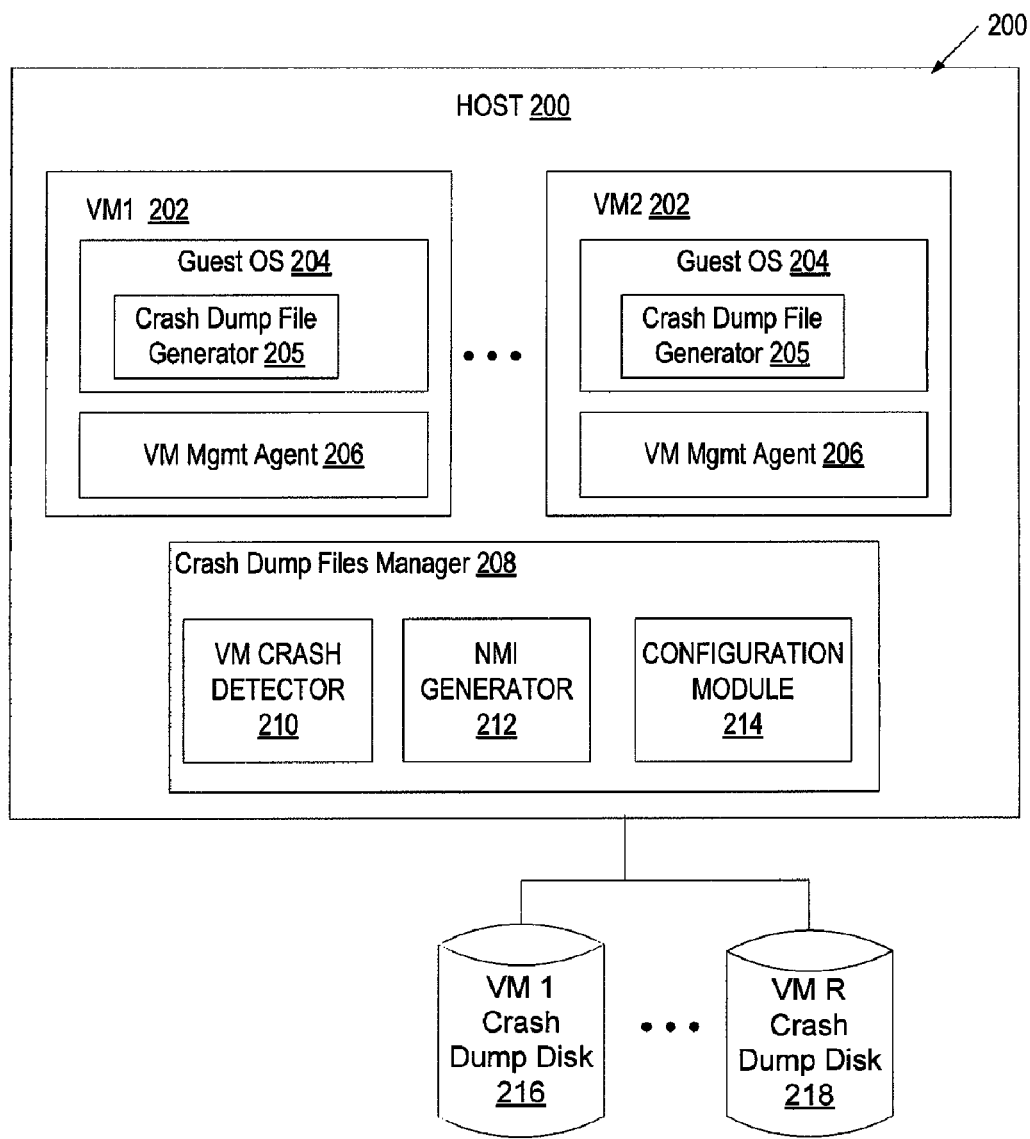
FIG. 2 is a block diagram of a host that may represent a server or a cluster of servers hosting VMs according to an embodiment of the invention.

FIG. 2 is a block diagram of one embodiment of a host 200 that may represent a server or a cluster of servers hosting VMs 202. In one embodiment, host 200 is the same as host 103 described with respect to FIG. 1. The host 200 includes a hypervisor (not shown) that manages one or more VMs 202. The hypervisor may contain or otherwise control a crash manager 208. In one embodiment, crash manager 208 is the same as crash manager 133 described with respect to FIG. 1.

In some embodiments, the crash manager 208 may include a VM crash detector 210, an NMI generator 212, and a configuration module 214. Alternatively, some or all of the above components may be external to the crash manager 208 and may communicate with the crash manager 208 via a network or a local means.

The VM crash detector 210 monitors events pertaining to individual VMs 202 to detect predefined events that indicate a crash of the VM 202. In some embodiments, the predefined events may be specified by a system administrator (e.g., via a user interface) or hard-coded. The predefined events may include, but are not limited to, the VM consuming 100% of the CPU for a predetermined length of time without any progress being made, a user report of the VM being stuck, occurrence of a Microsoft™ Windows™ blue screen, and a x86 double fault or triple fault (Intel™/AMD™ feature). In other embodiments, the VM 202 itself may recognize that it is having issues that may cause a crash event and may itself request the intervention of the crash manager 208 to assist in the creation of a crash dump file.

The NMI generator 212 causes a VM 202 to create and send an NMI event to the VM 202 upon the detection of a predefined crash event pertaining to the VM. Specifically, upon notification from the VM crash detector 210 of a crash event at a VM 202, the NMI generator 212 creates a NMI and sends it to the VM 202. In one embodiment, the NMI is used to execute an interrupt handler that causes a crash dump file to be created and causes the crash dump file to be sent to a VM crash dump disk 216, 218 associated with the particular VM 202. In one embodiment, the guest OS 204 of the VM 202 includes a crash dump file generator 205 that generates the crash dump file for the VM upon receiving the NMI event, which is discussed further below.

The configuration module 214 allocates crash dump storage to associate with a VM 202 being added to the host 200. In particular, configuration module 214 assigns, to the VM 202, one or more disks 216, 218 designated for crash dump files of the VM 202. The configuration of the crash file path in the VM OS 204 is done before the crash event takes place, as part of preparing the OS 204 for usage by the VM 202. Images (216, 218) of these disks are maintained in a single repository or separate repositories accessible to the crash manager 208. In one embodiment, the configuration module 214 provides a user interface allowing a user (e.g., a system administrator) to assign the above disks to a new VM 202. Alternatively, the disks are assigned to a new VM automatically. In addition, configuration module may interact with a VM management agent 206 of the VM 202 to configure the VM 202 to automatically send any created crash dump files to the associated crash dump disk 216, 218 for the VM 202 without being told by the crash manager 208 via the NMI event.

Each VM 202 includes a guest OS 204. The guest OS 204 can be any operating systems, such as Microsoft Windows, Linux, Solaris, Mac OS, etc. In addition, each guest OS 204 may include a crash dump file generator 205 that has a data operation handler (not shown) to receive the NMI event (e.g., from the hypervisor and/or host crash manager 208) upon a crash event occurring at the VM 202. The NMI event pertaining to a crash dump file may be a write request (e.g., create a crash dump file detailing events of crash) or a read request to read a crash dump file. The data operation handler of the crash dump file generator 205 creates the requested crash dump file and performs any other operations pertaining to the received NMI event.

FIG. 3 is a flow diagram illustrating a method 300 for handling temporary files by a guest operating system of a VM according to an embodiment of the invention. The method 300 may be performed by processing logic 426 of FIG. 4 that may comprise hardware (e.g., circuitry, dedicated logic, programmable logic, microcode, etc.), software (e.g., instructions run on a processing device to perform hardware simulation), or a combination thereof. In one embodiment, the method 300 is performed by hypervisor 132 described with respect to FIG. 1.

Referring to FIG. 3, the method 300 begins at block 310 with the hypervisor configuring an OS of a VM managed by the hypervisor with a crash dump file path for the VM to use in storing a crash dump file created by the VM. The crash dump file path leads to a standalone file of a separate virtual disk associated with the hypervisor and separate from the main root file system of the VM. This configuration occurs upon preparing the OS for usage by the VM, before any crash events have occurred to lead to creation of any crash dump files.

At block 320, it is then determined that a VM managed by the hypervisor is about to and/or has crashed. In one embodiment, the hypervisor includes logic to detect certain events emanating from the VM that indicate a crash. In other embodiments, the VM itself may indicate the crash condition to the hypervisor. At block 330, the hypervisor shuts down the VM in response to determining a crash event occurred at the VM.

Then, at block 340, the hypervisor obtains a crash dump file created by the VM that details the events associated with the crash. In some cases, the hypervisor may generate an NMI related to the crash event. In one embodiment, the NMI is used to execute an interrupt handler that causes the crash dump file to be created by the VM and sent to the designated virtual disk associated with the hypervisor that was configured in block 310. In one embodiment, the NMI directs the VM to send the crash dump file to the designated storage location for the VM's crash dump files. In other embodiments, the VM creates the crash dump file on its own, without the direction of an NMI event, and the hypervisor obtains the crash dump file directly from the pre-configured designated storage location.

At block 350, the hypervisor provides the crash dump file in the designated storage disk to support for analysis. In some embodiments, the crash dump file is provided upon request to the host controller. In other embodiments, the crash dump file is provided as part of a periodic sending of log files and other error files to the host controller. Then, at block 360, a new empty crash dump file virtual disk is created outside of the VM and the VM OS is configured to store its crash dump files to this location. Lastly, at block 370, the VM is rebooted.

Figure 4:
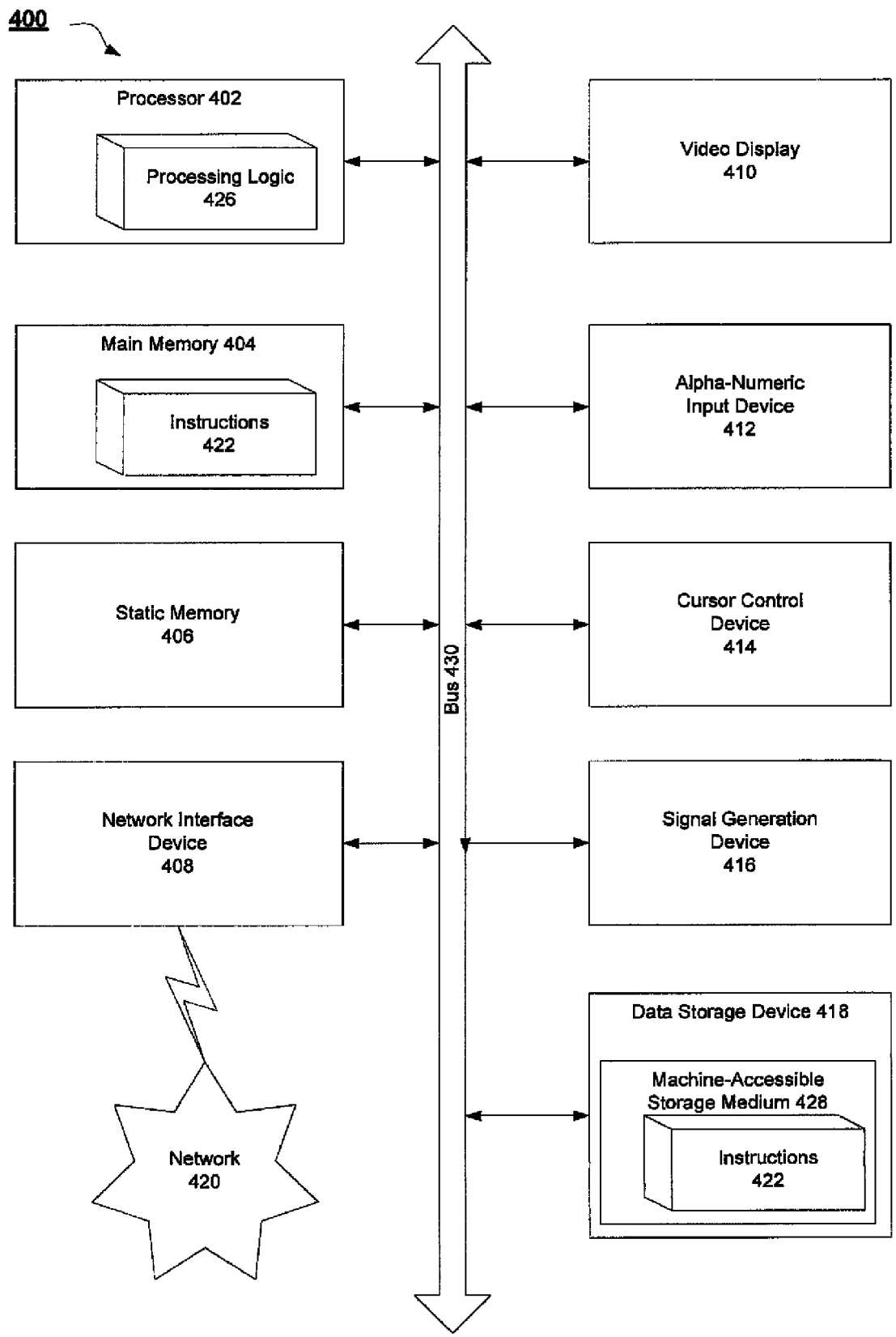
FIG. 4 illustrates a block diagram of one embodiment of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 428 on which is stored one or more set of instructions (e.g., software 422) embodying any one or more of the methodologies of functions described herein. For example, software 422 may store instructions to perform saving crash dump files of a VM on a designated disk by host machine 200 described with respect to FIG. 2. The software 422 may also reside, completely or at least partially, within the main memory 404 and/or within the processing device 402 during execution thereof by the computer system 400; the main memory 404 and the processing device 402 also constituting machine-accessible storage media. The software 422 may further be transmitted or received over a network 420 via the network interface device 408.

The machine-readable storage medium 428 may also be used to stored instructions to perform method 300 for saving crash dump files of a VM on a designated disk described with respect to FIG. 3, and/or a software library containing methods that call the above applications. While the machine-accessible storage medium 428 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A computer-implemented method, comprising:
associating, by a hypervisor that virtualizes a plurality of virtual machines (VMs) on a host machine, each VM of the plurality of VMs with a crash dump disk that is solely dedicated to the VM, wherein each crash dump disk is located separate from its associated VM and separate from operating system (OS) files of its associated VM;
configuring, by the hypervisor, an OS of each VM with a crash file path to the crash dump disk associated with the VM;
configuring, by the hypervisor, each VM of the plurality of VMs to:
generate crash dump files for the VM upon a crash event of the VM; and
store, via the crash file path, the generated crash dump files to the crash dump disk associated with the VM;
identifying, by the hypervisor, a crashed VM of the plurality of VMs that experienced a crash event;
stopping, by the hypervisor, operations of the crashed VM; and
obtaining, by the hypervisor from the crash dump disk associated with the crashed VM, a crash dump file created by the crashed VM that details the crash event.

2. The method of claim 1, further comprising providing the crash dump file of the crashed VM to a controller that manages the host machine.

3. The method of claim 2, wherein the providing the crash dump file is in response to a request for the crash dump file from the controller.

4. The method of claim 1, further comprising generating a non-maskable interrupt (NMI) upon identifying the crashed VM, and sending the NMI to the crashed VM, wherein the NMI causes the crashed VM to create the crash dump file and store the crash dump file in the crash dump disk associated with the crashed VM.

5. The method of claim 4, wherein the NMI is used to execute an interrupt handler routine at the VM that causes the VM to create the crash dump file and send the crash dump file to the designated crash dump disk.

6. The method of claim 1, wherein identifying the crashed VM comprises monitoring each VM of the plurality of VMs for one or more predetermined events that indicate a crash event of one of the plurality of VMs.

7. The method of claim 1, wherein identifying the crashed VM comprises receiving a notification from one of the plurality of VMs that the VM is encountering a situation requiring creation of a crash dump file.

8. A system, comprising:
a processing device;
a memory communicably coupled to the processing device; and
a hypervisor to virtualize the processing device and the memory for use by a plurality of virtual machines (VMs) hosted by the hypervisor, the hypervisor configured to:
associate each VM of the plurality of VMs with a crash dump disk that is solely dedicated to the VM, wherein each crash dump disk is located separate from its associated VM and separate from operating system (OS) files of its associated VM;
configure an OS of each VM of the plurality of VMs with a crash file path to the crash dump disk;
configure each VM of the plurality of VMs to:
generate crash dump files for the VM upon a crash event of the VM; and
store, via the crash file path, the generated crash dump files to the crash dump disk associated with the VM;
identify a crashed VM of the plurality of VMs that experienced a crash event;
stop operations of the crashed VM; and
obtain, from the crash dump disk associated with the crashed VM, a crash dump file created by the crashed VM that details the crash event.

9. The system of claim 8, wherein the hypervisor further configured to provide the crash dump file of the crashed VM to a controller that manages the host machine.

10. The system of claim 8, wherein the hypervisor further configured to generate a non-maskable interrupt (NMI) upon identifying the crashed VM, and send the NMI to the crashed VM, wherein the NMI causes the crashed VM to create the crash dump file and store the crash dump file in the crash dump disk associated with the crashed VM.

11. The system of claim 10, wherein the NMI is used to execute an interrupt handler routine at the crashed VM that causes the crashed VM to create the crash dump file and send the crash dump file to the crash dump disk associated with the crashed VM.

12. The system of claim 8, wherein the hypervisor configured to identify the crashed VM further comprises the hypervisor configured to monitor each VM of the plurality of VMs for one or more predetermined events that indicated a crash of one of the plurality of VMs.

13. The system of claim 8, wherein the hypervisor configured to identify the crashed VM further comprises the hypervisor configured to receive a notification from the crashed VM that the crashed VM is encountering a situation requiring creation of a crash dump file.

14. A non-transitory machine-readable storage medium including data that, when accessed by a machine, cause the machine to perform operations comprising:
associating, by a hypervisor that virtualizes a plurality of virtual machines (VMs) on a host machine, each VM of the plurality of VMs with a crash dump disk that is solely dedicated to the VM, wherein each crash dump disk is located separate from its associated VM and separate from operating system (OS) files of its associated VM;
configuring, by the hypervisor, an OS of each VM with a crash file path to the crash dump disk associated with the VM;
configuring, by the hypervisor, each VM of the plurality of VMs to:
generate crash dump files for the VM upon a crash event of the VM; and
store, via the crash file path, the generated crash dump files to the crash dump disk associated with the VM;
identifying, by the hypervisor, a crashed VM of the plurality of VMs that experienced a crash event;
stopping, by the hypervisor, operations of the crashed VM; and
obtaining, by the hypervisor from the crash dump disk associated with the crashed VM, a crash dump file created by the crashed VM that details the crash event.

15. The non-transitory machine-readable storage medium of claim 14, wherein the data, when accessed by the machine, causes the machine to perform further operations comprising providing the crash dump file stored to a controller that manages the host machine.

16. The non-transitory machine-readable storage medium of claim 14, wherein the data, when accessed by the machine, causes the machine to perform further operations comprising:
   generating a non-maskable interrupt (NMI) upon identifying the crashed VM; and
   sending the NMI to the crashed VM, wherein the NMI causes the VM to create the crash dump file and store the crash dump file in the crash dump disk associated with the crashed VM.

17. The non-transitory machine-readable storage medium of claim 14, wherein identifying the crashed VM comprises monitoring each VM of the plurality of VMs for one or more predetermined events that indicate a crash event of one of the plurality of VMs.

18. The non-transitory machine-readable storage medium of claim 14, wherein identifying the crashed VM comprises receiving a notification from one of the plurality of VMs that the VM is encountering a situation requiring creation of a crash dump file.

* * * * *